(12) United States Patent
Gourraud (10) Patent No.: US 7,523,165 B2
(45) Date of Patent: Apr. 21, 2009

(54) TRANSMISSION OF APPLICATION INFORMATION AND COMMANDS USING PRESENCE TECHNOLOGY

(75) Inventor: Christophe Gourraud, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 661 days.

(21) Appl. No.: 10/327,127

(22) Filed: Dec. 24, 2002

(65) Prior Publication Data

US 2004/0122896 A1 Jun. 24, 2004

(51) Int. Cl.
G06F 15/16 (2006.01)
G06F 15/177 (2006.01)

(52) U.S. Cl. ................. 709/206; 709/204; 709/220; 709/203

(58) Field of Classification Search ............ 709/204, 709/220, 203, 206
See application file for complete search history.

(56) References Cited

U.S. PATENT DOCUMENTS

| | | | |
|---|---|---|---|
| 6,453,362 B1 * | 9/2002 | Bittinger et al. | 719/316 |
| 6,463,471 B1 * | 10/2002 | Dreke et al. | 709/224 |
| 6,658,095 B1 * | 12/2003 | Yoakum et al. | 379/93.01 |
| 6,757,722 B2 * | 6/2004 | Lonnfors et al. | 709/220 |
| 6,822,945 B2 * | 11/2004 | Petrovykh | 370/270 |
| 7,254,610 B1 * | 8/2007 | Turner et al. | 709/204 |
| 2003/0097403 A1 * | 5/2003 | Bhatia et al. | 709/203 |
| 2003/0110228 A1 * | 6/2003 | Xu et al. | 709/207 |
| 2005/0273499 A1 * | 12/2005 | Goodman et al. | 709/206 |

FOREIGN PATENT DOCUMENTS

WO    WO 02/096128    11/2002

OTHER PUBLICATIONS

International Search Report, dated May 7, 2004, for PCT application PCT/CA03/01924.
H. Sugano et al., Common Presence and Instant Messaging (CPIM) Presence Information Data Format, Internet Draft, XP-002277480, Oct. 2002.
J. Rosenberg et al., Session Initiation Protocol (SIP) Extensions for Presence, Internet Draft XP-002228500, May 20, 2002.

* cited by examiner

*Primary Examiner*—Kevin Bates
(74) *Attorney, Agent, or Firm*—Alex Nicolaescu; Ericsson Canada Inc.

(57) ABSTRACT

A method, a system, a User Equipment (UE) and an application platform for exchanging application information between a presence entity and a watcher, wherein the presence entity publishes application information or commands destined to a certain application, in the form of a presence tuple. The watcher subscribes to presence information associated with the certain application, and once authorized, receives the tuple with the application information or command. An UE or an application platform run several applications, and comprise a SUBSCRIBE Dispatcher module and a PUBLISH Handler module for sending presence SUBSCRIBE messages and presence PUBLISH messages for requesting or providing the application information and commands.

6 Claims, 5 Drawing Sheets

FIG_3A

FIG. 3B

FIG_5

TRANSMISSION OF APPLICATION INFORMATION AND COMMANDS USING PRESENCE TECHNOLOGY

BACKGROUND OF THE INVENTION

1. Field of the Invention

The present invention relates to the exchange of information among service applications in a telecommunications network.

2. Description of the Related Art

One new service application offered by the telecommunications world is the so-called "presence" technology. Presence is a type of application that makes possible to locate and identify a terminal device, herein called a User Equipment (UE), including, for example, handheld computers, Personal Digital Assistants (PDAs), laptops or personal computers (PCs), mobile phones, etc, wherever they might be, as soon as the user connects to the network. One application of presence technology, Instant Messaging (IM), is already very popular. Presence technology is expected to be an integral part of third generation (3G) wireless networks, and is likely to be employed across a wide variety of communication devices, as mentioned. A significant number of wireless application service providers are developing platforms for mobile presence applications.

Presence is also, and mainly, a way for a user to express his willingness to communicate with other users, and to publicize in the network the communication means that he may employ. Among other possibilities, users of the technology may automatically set up an impromptu teleconference by connecting all the parties as soon as they are detected to be available, or present. Privacy issues can be addressed by allowing a high degree of user-defined control, for example by allowing people to select conditions in which they would be seen as present, i.e. detectable.

However, presence technology is not really new. The "finger" service and protocol have been around since the mid-1970s. It was a way to tell who was on a given host and what program they were executing. But for security reasons, nearly everyone has disabled this service and blocked its ports. Today, presence is most often found in the Instant Messaging world, where services such as AOL's AIM™, Microsoft's Messenger™ and Lotus' Sametime™ give friends, family and colleagues the ability to know whether someone is at their computer in addition to the quick text messaging. Predictably, a significant percentage of companies have blocked these services as well.

What is relatively new is the interest in merging instant messaging, IP-based Telephony, and the presence technology. The Internet Engineering Task Force (IETF) and the Third Generation Partnership Project (3GPP) have a number of drafts and specifications in the work, including the Common Presence and Instant Messaging (CPIM) and SIMPLE, which is the SIP (Session Initiation Protocol) for Instant Messaging and Presence Leveraging Extensions. These drafts and specifications define presence-related features and associated signaling protocols allowing network operators to provide presence services to their subscribers. They usually make use of a network entity called a presence server that receives and composes presence information about a user (or even a group of users or a service), which is also called, in the context of a presence-related application, a presence entity. The present server further provides presence information to watcher entities, also called herein watchers, interested in the presence information relating to a presence entity. Watchers can either fetch or monitor the presence information.

Presence information can originate from the network, e.g. from a registration status, activity, or location, or from a number of presence user agents publishing information on behalf of the user, e.g. mobile and fixed devices, application servers, etc.

Figure 1:
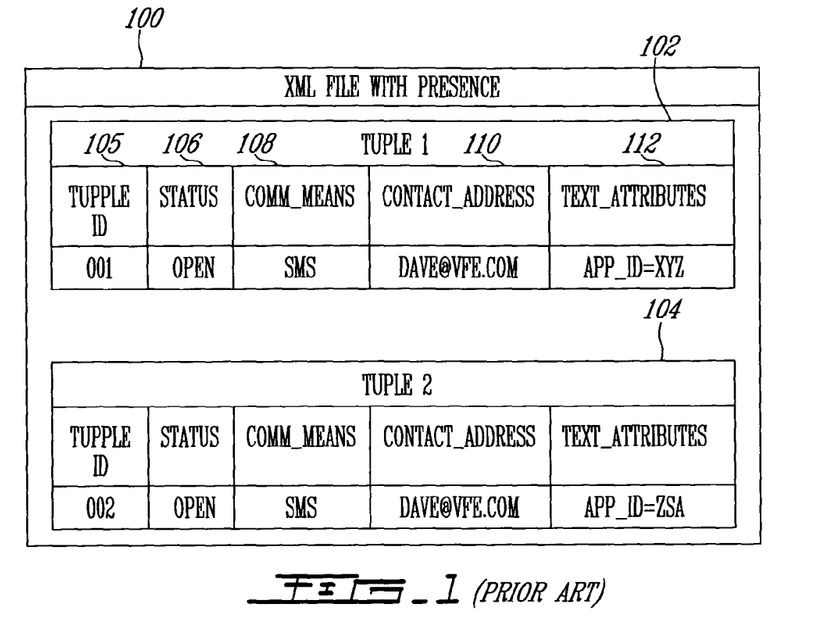
FIG. 1 (Prior Art) is an exemplary illustration of a presence XML document with two tuples.

The presence information associated with an UE may be distributed in the network as an XML document comprising one or more tuples. Reference is now made to FIG. 1 (Prior Art), which depicts an exemplary illustration of such a presence XML document 100 with two tuples 102 and 104. A tuple 102 comprises a tuple identifier 105 for identifying the tupple, and status information 106 related to the presence entity UE, such as for example OPENED or CLOSED status, wherein the status information defines the current status of the communication means described by the tuple. The tuple 102 further comprises other communication means information 108, such as for example short message service (SMS), that defines through which communication means the UE 10 can communicate, and contact address information 110 identifying the UE. Finally, the tuple 102 may comprise one or more attributes 112 that may define various parameters associated with the UE, including data files or links to files. The watcher interested in the presence information of the UE 10 may filter information it is interested in. For example, in a particular SMS broadcast application, a watcher may request from a presence server only UEs' identities which i) tuples' communication means are set to SMS, or ii) tuples' contact addresses are set to a specific value, or are of a specific type (e.g. SIP URI).

Figure 2:
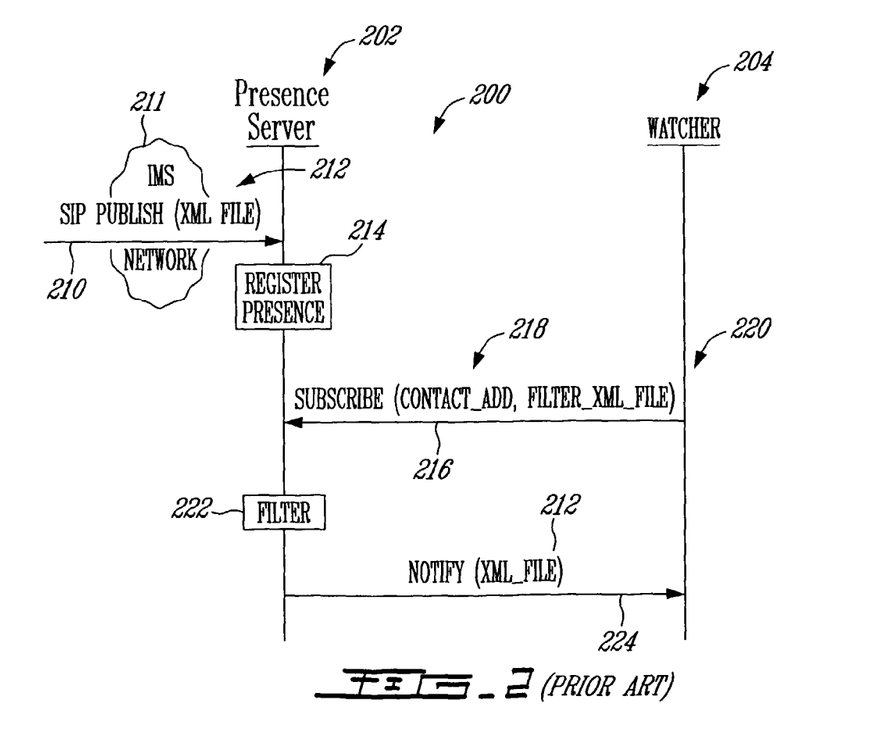
FIG. 2 (Prior Art) is an exemplary nodal operation and signal flow diagram of a network implementing an exchange of presence information.

Reference is now made to FIG. 2 (Prior Art) that shows an exemplary nodal operation and signal flow diagram of a network 200 implementing an exchange of presence information. Shown in FIG. 2 is a presence server 202 that manages presence information for one or more UEs and a watcher 200 that is interested in presence related information about a given UE from the one or more UEs. First, the presence server 202 receives via the IP Multimedia Subsystem Core Network (IMS, IP multimedia network (IPMM) based on the SIP protocol, such as the one specified by 3GPP) network 211 a SIP PUBLISH message 210 with a presence XML document 212 that comprises one or more tuples with presence information about a given UE (not shown). The PUBLISH message 210 may come from several different sources publishing presence information on behalf of the user, including from the user terminal itself, form a registration action of the user terminal or from other entities of the network. In action 214, the presence server 202 registers the tuples comprised in the XML file 212. In action 216, the watcher 204 sends a SUBSCRIBE message addressed to one of the public contact addresses 218 of the user in the IMS (a SIP URI), and a filter 220. The filter 220 may be in the form of another XML document and may contain any filtering information provided by the watcher 204, defining the presence information it is interested in receiving from the presence server. In action 222, the present server 202 authenticates the message 216. The presence server may need to perform authentication by itself, using standard IETF mechanisms (e.g. HTTP digest), then it applies authorization policies to the request (is the watcher allowed to see presence information?), which may lead to its rejection. Finally, the presence server checks the access rights associated to the watcher, and filters its presence information based on the access rights of the watcher and the filter 220. The presence server 202 returns to the watcher 202 a NOTIFY message with the XML file 212, which is in the present situation contains the result of the filtering 222, action 224. The tuples provided are the intersection between the tuples identified by the filters and those the watcher is allowed to access.

So far, in the existing presence applications, the exchange of presence information is limited to exchanging presence information associated with contact addresses and communication means of UEs. Very recently, a committee of the 3GPP has discussed the possibility of including an application identifier in the text attributes field 112 of a tuple 102, as shown in FIG. 1 (Prior Art). However, no mention was made on the purpose of such inclusion, nor was it mentioned what advantages can be obtained.

The present invention proposes to use an application identifier stored in presence tuples for enabling the exchange of information and commands between applications or components of distributed applications running in terminals (e.g. UEs) and application servers. The exchanges may take place between terminals, between application servers, and between terminals and application servers.

SUMMARY OF THE INVENTION

In one aspect, the present a method for exchanging application information between a presence entity and a watcher, the method comprising the steps of:
 a presence entity publishing a tuple comprising application information relating to an application;
 a watcher subscribing to presence information associated with the application; and
 responsive to the subscription, sending to the watcher the tuple with the application information.

In another aspect, the present invention is an IP-based network comprising:
 a presence server responsible for providing presence-related services to presence subscribers of the IP-based network;
 a presence entity that publishes a tuple comprising application information relating to an application, the tuple being received by the presence server; and
 a watcher that subscribes with the presence server to presence information associated with the application;
 wherein responsive to the subscription, the presence server sends to the watcher the tuple with the application information.

In yet another aspect, the present invention is a User Equipment (UE) comprising:
 a plurality of applications; and
 a SUBSCRIBE Dispatcher module receiving an application identifier from each one of at least two of the plurality of applications, and for sending a SUBSCRIBE message indicative of a desire of the UE to receive presence information relative to the least two of the plurality of applications.

In yet another aspect, the present invention is an application platform for use in a User Equipment (UE), the platform supporting:
 a plurality of applications; and
 a SUBSCRIBE Dispatcher module receiving an application identifier from each one of at least two of the plurality of applications, and for sending a SUBSCRIBE message indicative of a desire of the UE to receive presence information relative to the least two of the plurality of applications.

In yet another aspect, the present invention is an User Equipment (UE) comprising:
 a plurality of applications; and
 a PUBLISH Handler module receiving application information from each one of at least two of the plurality of applications, and for sending a PUBLISH message comprising the application information from each one of at least two of the plurality of applications.

In yet another aspect, the invention is an application platform to be used with an User Equipment (UE), the platform supporting:
 a plurality of applications;
 a PUBLISH Handler module receiving application information from each one of at least two of the plurality of applications, and for sending a PUBLISH message comprising the application information from each one of the at least two of the plurality of applications.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

The innovative teachings of the present invention will be described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

The present invention allows for the exchange of application information and commands based on presence technology. The present invention allows, for example, for application information and commands to be stored in a presence tuple of a presence XML document, thus enabling the transmission of application information and commands based on the presence of a User Equipment (UE) presence entity.

The preferred embodiment of the present invention will be described using various exemplary scenarios of an exchange of service application information and commands.

Figure 3A:
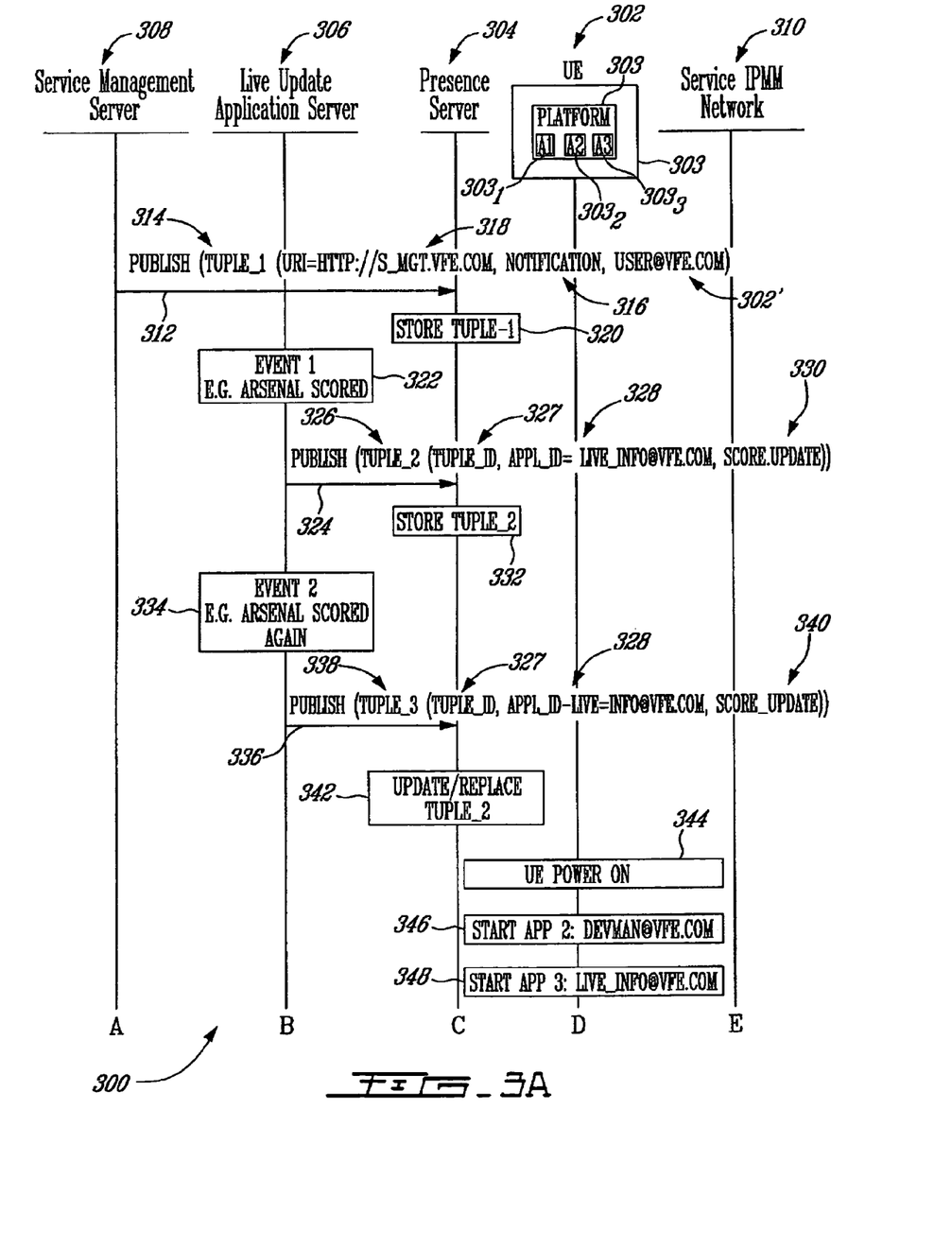
FIG. 3 is is an exemplary nodal operation and signal flow diagram of a network implementing an exchange of information based on presence information according to the preferred embodiment of the invention.
Figure 3B:
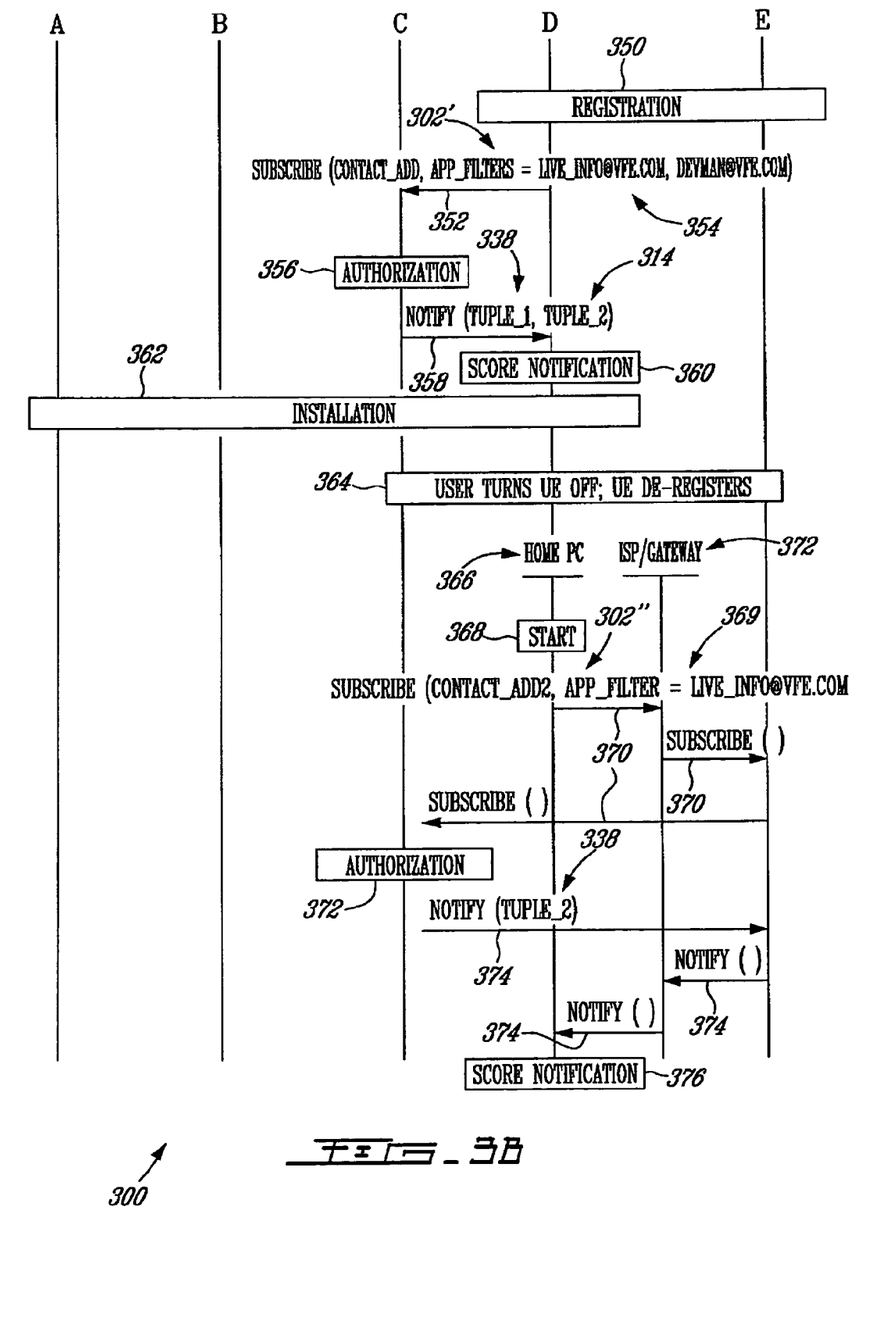

Reference is now made to FIG. 3, which is an exemplary nodal operation and signal flow diagram of a network 300 implementing an exchange of service application information based on presence according to the preferred embodiment of the invention. Shown in FIG. 3, is first an UE 302, also called herein the presence entity. For the purpose of the present scenario it is assumed that the UE 302 has subscribed to presence service provided by a presence server 304 of the network 300. The UE 302 also has a platform 303 on which run (when the UE 302 is powered on):

a first client application 303$_1$ (live information client application) for receiving live information updates such as soccer match results, the first client application 303$_1$ being identified by Application ID =live info@vfe.com; and a second client application 303$_2$ (device manager client application) responsible for fetching terminal configuration updates and patches, wherein the second client application 303$_3$ runs in the background and is not visible to the user. This second application is identified by Application ID=dev manager@vfe.com.

It is also assumed that i) the user of the UE 302 has recently subscribed to a new service called Anti-Car Theft, which subscription is pending the operator's authorization and service activation, and ii) that at the present time the UE 302 is turned off.

Further shown in FIG. 3, is a first application server 306, which is a live update application server responsible for sending live soccer results to the live information client application 303$_1$ of the UE 302. For the purpose of the present exemplary scenario of FIG. 3, it is assumed that a live soccer match is currently being played between English Premier League' teams Arsenal and Manchester United.

The network 300 further comprises a second application server 308, which is a service management application server responsible for providing new services to, and for managing applications of the network's UEs, such as for example the UE 302. Server 308 provides of the information input for the client applications 303$_2$ of the UE 302.

Finally, network 300 comprises a Serving IPMM network 310 responsible for providing a secured and accountable routing of SIP messages between all these entities for the UE 302.

The service application Anti-Car Theft requested by the UE 302 user has been successfully authorized, provisioned and activated for the user, and requires an application to be downloaded into the UE 302. The service manager server 308 responsible of this application sends to the presence server 304 a PUBLISH message 312 on behalf of the user. In conformance with 3GPP standards for presence, the message is addressed to one of the public identities of the user in the IMS network 300, such as for example to the UE 302. The message 312 comprises a tuple 314 including the identity 302' of the user of the UE 302, a notification 316 with the good news, as well as an HTTP Uniform Resource Indicator (URI) 318 pointing to the application to be downloaded. The tuple 314 is received by the presence server 304, and stored for the UE 302, action 320.

In action 322, during the live soccer match, Arsenal has just scored against Manchester United. The live update application server 306 notifies the presence server 304, and for this purpose sends a PUBLISH message 324 to the presence server 304, wherein the message 324 is addressed to the UE 302 and comprises a tuple 326 including i) a tuple identity 327, ii) the application identification 328 to which the message is addressed, and iii) the score update information 330. In action 332, the presence server 304 stores the tuple 326 for the UE 302.

Arsenal is in great shape today, and in action 334 scores a new goal. The live update application server 306 sends another PUBLISH message 336 to the presence server 304, wherein the second message 336 is addressed to the same UE 302 and comprises another tuple 338 including i) a tuple identity 327, ii) the application identification 328 to which the message is addressed, and iii) the score update information 340. In action 342, the presence server 304 replaces the tuple 326 with the tuple 338 having the same tuple identity, which is stored in the presence server 304.

At one point during the soccer match, the UE 302 is powered on, action 344. In actions 346 and 348, because the UE 302 was turned on, the platform 303 starts the client applications live info@vfe.com 303$_1$ and dev manager@vfe.com 303$_1$, and the UE 302 registers with the serving IPMM network 310 using its identity user@vfe.com, action 350. Following the user's registration, the two client applications express their desire to receive information updates. For this purpose, the UE 302 sends a SUBSCRIBE message 352 to the presence server 304 requesting information relating to the two applications, wherein the message includes first, the identity 302' of the public identifier of the UE 302, and second, filters 354 that identify the two applications live info@vfe.com and dev manager@vfe.com. The message 352 is received by the presence server 304 and authorized in action 356. Responsive to the SUBSCRIBE message 252, the presence server 304 responds with a NOTIFY message 358 including tuples 314 and 338 that were stored in the presence server 304 for the user of the UE 302. The UE 302 receives tuple 338 with the soccer match score update and is notified of the latest score, action 360. The UE 302 also receives tuple 314 with a notification 316 of the new service activation of the Anti-Car Theft application with its corresponding URI 318. In action 362, the UE 302 connects to the specified URI and performs the installation of the new application, which becomes the third client application 303$_3$ (service management client application) to run on the platform 303 of the UE 302. When installation 362 is completed, the user of the UE 302 turns off the terminal, which de-registers from the serving network 310, action 364.

Still during the soccer match, the user leaves his office and reaches his home, where he turns on his home Personal Computer (PC) 366 in order to be continuously notified of any score update. In action 368, the home PC 366 is powered on, and because it is also registered with presence service, sends a SUBSCRIBE message 370 to the Presence Server 304 for requesting information relating to the live update application 303$_1$. It is understood, that the SUBSCRIBE message 370 may be routed through an Internet Service Provider (ISP) and Gateway 372 and through a serving IPMM network 310 before its reaches the presence server 304. The SUBSCRIBE message 370 comprises the identity 302" of the home PC terminal 366 and a filter 369 identifying the live update application live info@vfe.com 303$_1$, for which information is requested. In action 372, the SUBSCRIBE message 370 is authorized by the presence server 304, which responds back to the home PC 366 with a NOTIFY message 374 comprising the latest tuple 338 relating to the live update client application. The home PC 366 receives the tuple 338, and because any team scored no new goal, the user is notified of the same score of the soccer match between the teams Arsenal and Manchester united, action 376.

It is understood, although not specifically shown in FIG. 3, that if the user were to turn his UE 302 on again, and start the live info client application, he would receive the score updates simultaneously on his two terminals, i.e. on the UE 302 and on the home PC as shown.

Figure 4:
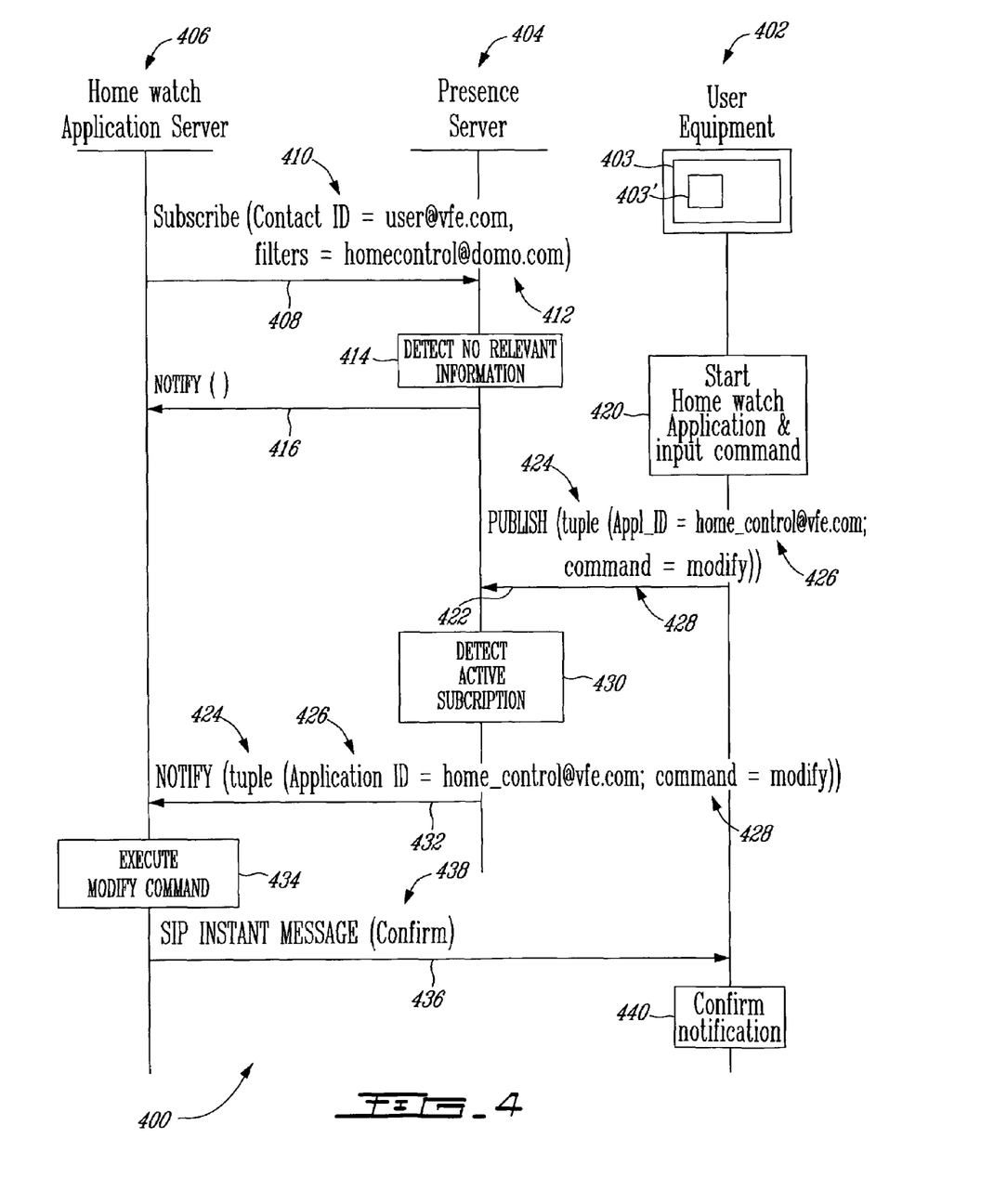
FIG. 4 is is an exemplary nodal operation and signal flow diagram of a network implementing an exchange of commands based on presence information according to the preferred embodiment of the invention.

The present invention also allows for service application commands to be sent in the network based using presence technology. Reference is now made to FIG. 4, which is an exemplary nodal operation and signal flow diagram of a network 400 implementing an exchange of service application commands based on presence according to the preferred embodiment of the invention. Shown in FIG. 4, is an UE 402, also called herein the presence entity. For the purpose of the present scenario it is assumed that the UE 402 has subscribed to presence service provided by a presence server 404 of the network 400. The UE 402 comprises a platform 403 on which runs (when the UE 302 is powered on), a first client application $403_1$ called a home watch client application for controlling a home watch and surveillance system of the user, the first client application $403_1$ being identified by an application ID =home control@vfe.com. A Home Watch application server 406 is responsible for running and/or managing the home watch and surveillance system on the site of the monitored home or somewhere else in the network 400. First, the home watch application server 406 sends a SUBSCRIBE message to the presence server 404 in order to register its interest for receiving presence information relating the home control application $403_1$, of the UE 402. For this purpose, the message 408 is addressed to one of the public identities of the user, such as for example to the user's UE 402 identified by address user@vfe.com 410, and includes filters 412 comprising the identity home control@vfe.com of the home watch application $403_1$, wherein the filters 412 identify the applications for which presence information is requested by the server 406 from the presence server 404. The presence server 404 receives the message 408 and based on the filters 412, detects no relevant information therein associated with the requested application, action 414, and therefore responds with an empty NOTIFY message in action 416.

At a later point, the subscriber of the UE 402 starts the home watch client application $403_1$, on the UE 402, and inputs a command for modifying an operational parameter of the home watch application server 406, action 420. Responsive to the modify command, the UE sends a PUBLISH message 422 with the modify command for informing the presence server 404 that the operation of the home watch application should be modified on the server 406. According to the invention, for this purpose, the message 422 comprises a tuple 424 with an application identifier home control@vfe.com 426 that identifies the home watch and surveillance application, and iii) the modify command 428. In action 430, the presence server 404 detects an active subscription for the UE's 402 home control application that was registered based on the SUBSCRIBE message 408, and relays the tuple 424 to the home watch application server 406 using a NOTIFY message 432. In action 434, the home watch application server 406 extracts the modify command 428 from the tuple 434, and executes it by changing the operational parameter of the home watch application. Finally, in action 436 the home watch application server 406 sends a modify confirmation 438 using a SIP instant message to the UE 402, which displays the confirmation for the user, action 440.

Although the exemplary scenario that the therefore has been described with reference to only one type of command included in a presence tuple 424 in order to be retrieved by an application server, it is understood that any type of service application command(s) can be included in the presence tuple and distributed in the network for being retrieved by a corresponding application server, or by any other network entity that has subscribed to presence information related to a particular subscriber. Therefore, the present invention allows for a new application and use of the presence technology, wherein service application information and commands may be included, for example, in the attribute field(s) of a presence tuple, and distributed to any watcher entity interested in receiving presence information of a given presence entity. The invention may support both client/server (one application or application component issues presence information requests to another) and peer-to-peer model (each application acts simultaneously as a client/publisher and a server/watcher).

Figure 5:
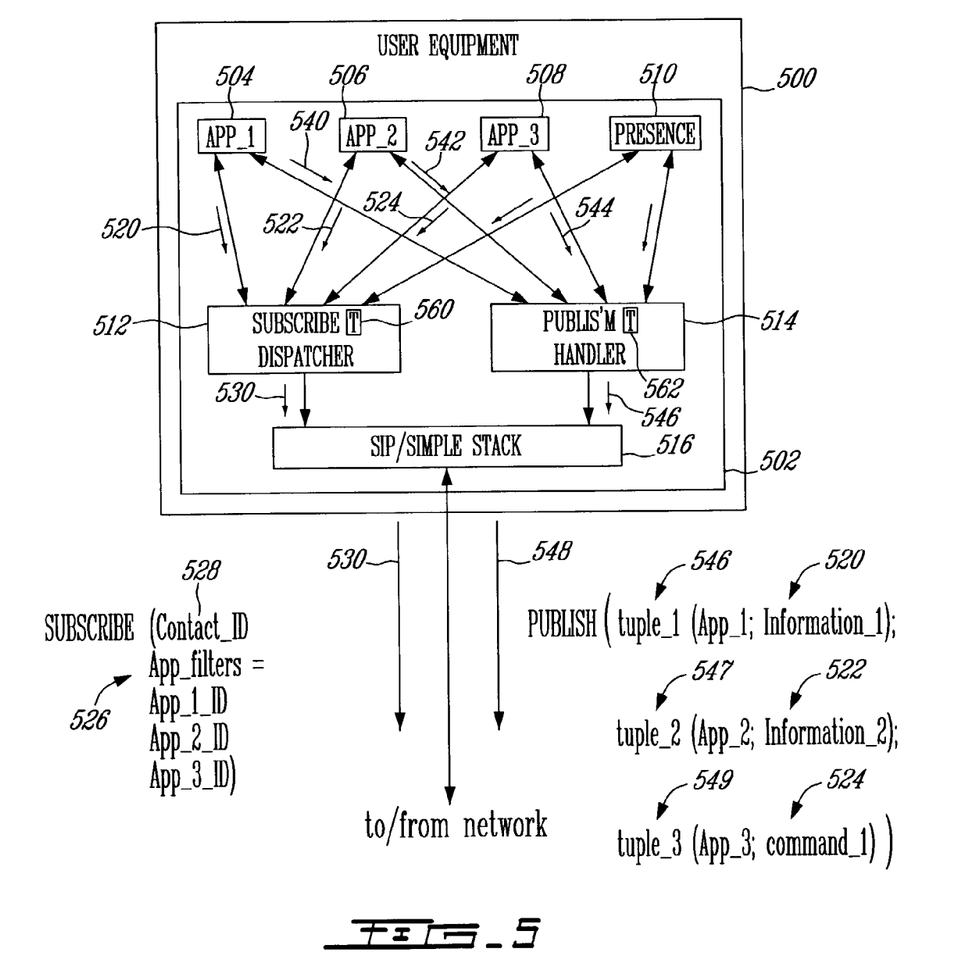
FIG. 5 is an exemplary high-level block diagram illustrative of a User Equipment (UE) implementing a variant of the preferred embodiment of the present invention.

Reference is now made to FIG. 5, which shows an exemplary high-level block diagram illustrative of a User Equipment (UE) 500 implementing an optional variant of the preferred embodiment of the present invention related to the UE functionality for supporting the exchange of service application and command using the presence technology. According to this variant, the UE 500 comprises an application platform 502 that supports three client service applications 504, 506, and 508 that may provide various services for the UE 500. The client service obligations 504, 506, and 508 may be similar to the service publications $303_1$, $303_2$, $303_3$, and $403_1$ previously described with relation to FIGS. 3 and 4. The platform 502 also supports a presence client application 510 that is responsible of presence related applications for the UE 500, i.e. it permits the user to publish his willingness to communicate, to monitor the presence of his friends, and to initiate instant messages or multimedia sessions. The platform 502 of the UE 500 further includes i) a SUBSCRIBE dispatcher module 512 that is responsible for registering the interest of each one of the client applications 504, 506, and 508 in receiving presence information from the network and to dispatch received tuples to their adequate destinations, and, ii) a PUBLISH handler module 514 that is responsible for publishing presence tuples comprising service application commands issued by the client applications 504, 506, and 508. Finally, the platform 502 includes a SIP/SIMPLE stack 516 that is responsible of formatting the information exchanged by the UE 500 with the network into is the SIP/SIMPLE protocol.

When they desire to subscribe to presence information from the network, the client service applications 504, 506 and 508 send their application identifiers 520, 522 and 524 to the SUBSCRIBE dispatcher module 512, which formats the application identifiers into a filter 526 included, along with the contact identifier 528 of the UE 500, into a SUBSCRIBE message 530 that is sent to the network, e.g. to a presence server, as previously described with reference to FIGS. 3 and 4.

In an analogous manner, when any one of the applications 504, 506 and 508 desire to send application information or commands to the network, such as for example the information 540, 542, or the command 544, the information 540, 542, or the command 544 are sent from the relevant client applications to the PUBLISH handler module 514. The received information and command are formatted into the tuples 546, 547, and 549 by the PUBLISH handler module 514, wherein the tuples comprise the respective application identifier 550, 552, and 554 and the respective information or command 540, 542, and 544. The tuples 546, 547, and 549 are included in a PUBLISH message 548 that is sent to the network, e.g. to a presence server, as previously described with reference to FIGS. 3 and 4.

The modules 512 and 514 allow to minimize the information traffic that its output by the UE 500 by including several elements of information into the same SUBSCRIBE or PUBLISH message. For example, in yet another variant of the invention, both modules 512 and 514 may comprise timers 560 and 562 for waiting for certain period of time before issuing the SUBSCRIBE or the PUBLISH messages 530 and 546, for allowing more than one client application to send their registration 520, 522, or 524, or their associated command 540, 542 or 544 to the said modules.

Based upon the foregoing, it should now be apparent to those of ordinary skill in the art that the present invention provides an advantageous solution, which provides for the exchange of service application information and commands based on presence technology. Although the system and method of the present invention have been described in particular reference to certain exemplary actions for carrying out the invented concept, it should be realized upon reference hereto that the innovative teachings contained herein are not necessarily limited thereto, and may be implemented advantageously using different steps. For example, although the exemplary preferred embodiment of the invention has been described with reference being primarily made to the certain pieces of information and to certain commands, it is understood that any type of information, including but being not limited to text, hyperlinks, graphics, multimedia files, etc, can be transmitted according to the invention. Furthermore, it is also understood that various types of commands can be also transmitted using the invention, including but being not limited to text commands or instructions, hyperlinks, etc. It is also contemplated that the service application information and commands may be included in various portions of a presence tuple, including in the attribute field of such tuple. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth herein below.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for exchanging an application command, the method comprising the steps of:
   i) receiving at a presence server a subscription message from a watcher requesting presence information relative to an application, the subscription message comprising an identifier of the application;
   ii) receiving at the presence server from a presence entity a presence tuple comprising the application identifier and an application command to be executed by an application identified by the application identifier;
   iii) detecting an active subscription of the watcher for presence information relative to the application; and
   iv) sending to the watcher the tuple comprising i) the identifier of the application and ii) the application command to be executed by the watcher.

2. The method claimed in claim 1, wherein:
   step ii) comprises receiving by the presence server a PUBLISH message issued by the presence entity, the PUBLISH message comprising the tuple, wherein the tuple further includes a tuple identifier for identifying the tuple;
   step i) comprises receiving by the presence server a SUBSCRIBE message including the application identifier and a contact identity of the watcher; and
   step iii) further comprises authorizing by the presence server the SUBSCRIBE message, and delivering to the watcher the tuple.

3. The method claimed in claim 1, further comprising, after the step iv), the step of:
   iv) displaying application information to a user.

4. A presence server receiving a subscription message from a watcher requesting presence information relative to an application, the subscription message comprising an application identifier, the presence server further receiving from a presence entity a presence tuple comprising the application identifier and an application command to be executed by an application identified by the application identifier, the presence server detecting an active subscription of the watcher for presence information relative to the application, and sending to the watcher the tuple comprising i) the identifier of the application, and ii) the application command to be executed by the watcher.

5. The presence server claimed in claim 4, wherein the presence tuple is received in a PUBLISH message issued by the presence entity, the PUBLISH message comprising the tuple, wherein the tuple further includes a tuple identifier for identifying the tuple, and wherein the subscription message comprises a SUBSCRIBE message including the application identifier and a contact identity of the watcher.

6. A User Equipment (UE) comprising:
   a processor;
   a platform running on said processor;
   an application running on the platform; and
   a SUBSCRIBE dispatcher module that receives from the software application an application identifier that identifies the software application, the SUBSCRIBE dispatcher module sending to a presence server a subscription message requesting presence information relative to the software application, the subscription message comprising the identifier of the application;
   wherein the SUBSCRIBE dispatcher module receives, in response to the subscription message, a tuple comprising i) the identifier of the application and ii) an application command for execution by the application.

* * * * *